United States Patent
Kurita et al.

(10) Patent No.: US 7,365,961 B2
(45) Date of Patent: Apr. 29, 2008

(54) SOLID-ELECTROLYTE CAPACITOR, MANUFACTURING METHOD THEREOF, AND DIGITAL SIGNAL PROCESSING SUBSTRATE USING THE SOLID-ELECTROLYTE CAPACITOR

(75) Inventors: Junichi Kurita, Osaka (JP); Tsuyoshi Yoshino, Kyoto (JP); Hirotoshi Toji, Osaka (JP); Kazuo Kawahito, Osaka (JP); Takashi Iwakiri, Kyoto (JP); Hiroshi Serikawa, Osaka (JP); Kenji Kuranuki, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/662,368

(22) PCT Filed: Oct. 11, 2005

(86) PCT No.: PCT/JP2005/018671

§ 371 (c)(1),
(2), (4) Date: Mar. 8, 2007

(87) PCT Pub. No.: WO2006/041047

PCT Pub. Date: Apr. 20, 2006

(65) Prior Publication Data

US 2008/0002335 A1    Jan. 3, 2008

(30) Foreign Application Priority Data

Oct. 15, 2004  (JP) ............................. 2004-301152
Feb. 24, 2005  (JP) ............................. 2005-048355
May 31, 2005  (JP) ............................. 2005-158704

(51) Int. Cl.
*H01G 9/00* (2006.01)

(52) U.S. Cl. ............... 361/523; 361/525; 361/528; 361/529; 361/540; 361/508; 29/25.01; 29/25.03

(58) Field of Classification Search ............... 361/523, 361/525, 528–529, 530–532, 534, 516–519, 361/508–512, 540–541; 29/25.01, 25.03
See application file for complete search history.

(56) References Cited

U.S. PATENT DOCUMENTS 6,236,561 B1 * 5/2001 Ogino et al. ............... 361/523

(Continued)

FOREIGN PATENT DOCUMENTS

| JP | 5-275292 | 10/1993 |
|----|----------|---------|
| JP | 7-226336 | 8/1995  |

(Continued)

*Primary Examiner*—Nguyen T. Ha
(74) *Attorney, Agent, or Firm*—Wenderoth, Lind & Ponack, L.L.P.

(57) ABSTRACT

A solid electrolytic capacitor includes a planar solid electrolytic capacitor element having anode and cathode portions; anode and cathode terminals; and insulating coating resin. The anode terminal is electrically connected at the top surface thereof to the anode portion. The cathode terminal is electrically connected at the top surface side thereof to the cathode portion. The coating resin integrally coats the capacitor element so as to expose the bottom surfaces of the anode and cathode terminals. The anode and cathode terminals are disposed as close to each other as not more than 3 mm. The anode and cathode terminals have stair steps on both sides thereof and are connected to the anode and cathode portions at joint faces, respectively. The anode joint faces and the cathode joint faces are coated with coating resin. The solid electrolytic capacitor is provided with the anode joint faces and/or the cathode joint faces.

21 Claims, 8 Drawing Sheets

U.S. PATENT DOCUMENTS

| | | |
|---|---|---|
| 6,343,004 B1 | 1/2002 | Kuranuki et al. |
| 6,751,086 B2 * | 6/2004 | Matsumoto ................. 361/523 |
| 6,808,541 B2 * | 10/2004 | Maeda ...................... 29/25.03 |
| 6,816,358 B2 * | 11/2004 | Kida et al. .................. 361/540 |
| 6,903,922 B2 * | 6/2005 | Sano et al. ................. 361/533 |
| 6,975,503 B2 * | 12/2005 | Abe et al. ................... 361/533 |
| 7,016,179 B2 * | 3/2006 | Ando ........................ 361/523 |

FOREIGN PATENT DOCUMENTS

| | | |
|---|---|---|
| JP | 2000-138138 | 5/2000 |
| JP | 2000-340463 | 12/2000 |
| JP | 2001-143966 | 5/2001 |
| JP | 2003-133177 | 5/2003 |
| JP | 2003-197485 | 7/2003 |

* cited by examiner

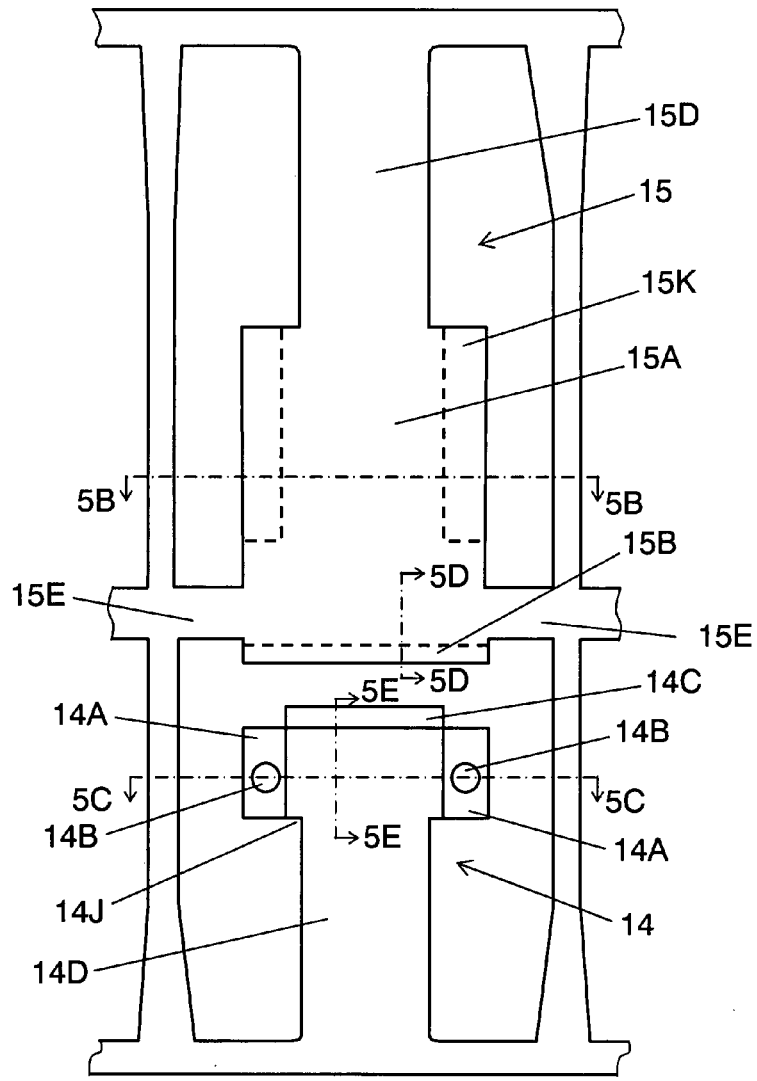
FIG. 5A
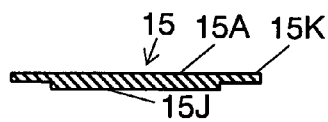
FIG. 5B
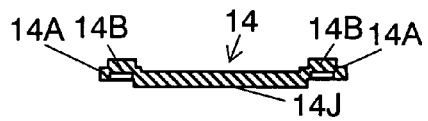
FIG. 5C
FIG. 5D
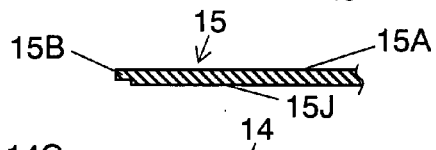
FIG. 5E

FIG. 8 – PRIOR ART
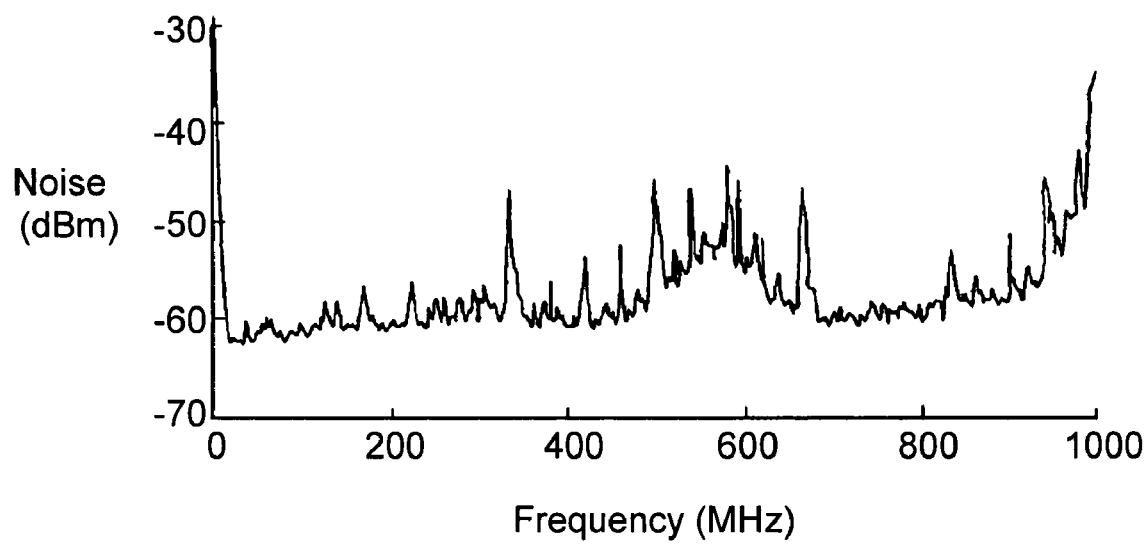
FIG. 9 – PRIOR ART
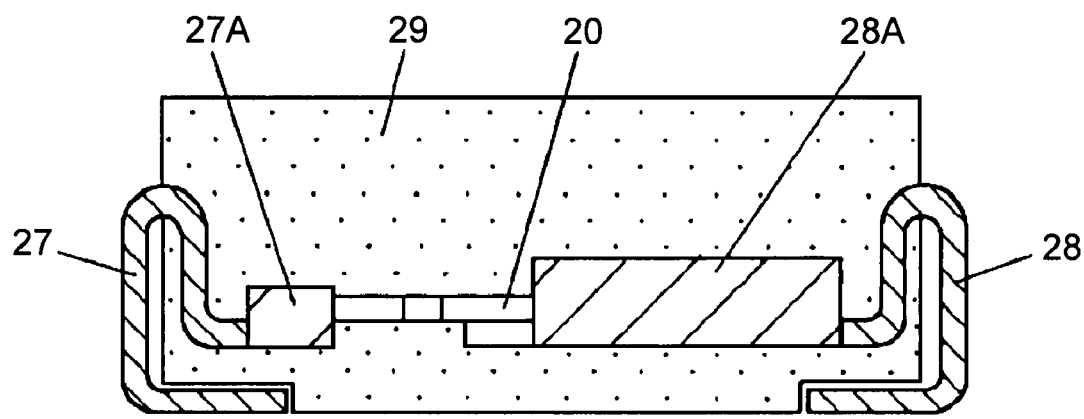

FIG. 10 – PRIOR ART
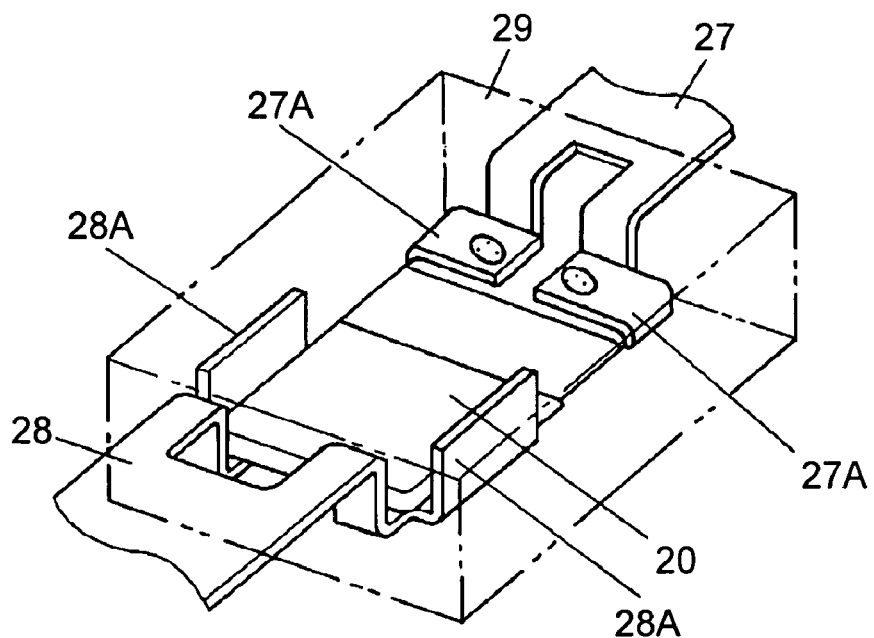
FIG. 11 – PRIOR ART
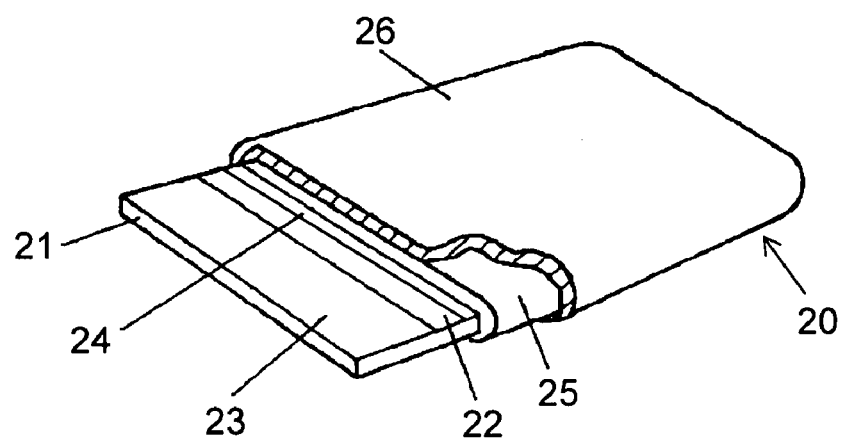

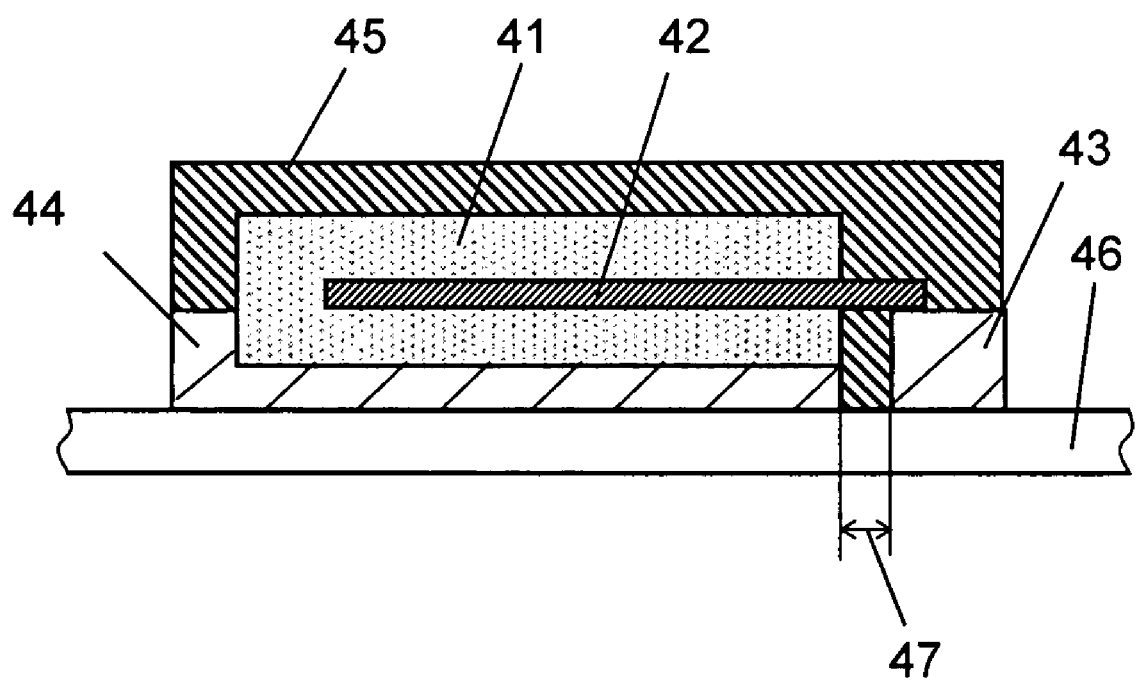
FIG. 12 – PRIOR ART

SOLID-ELECTROLYTE CAPACITOR, MANUFACTURING METHOD THEREOF, AND DIGITAL SIGNAL PROCESSING SUBSTRATE USING THE SOLID-ELECTROLYTE CAPACITOR

This application is a U.S. national phase application of PCT International Application PCT/JP2005/018671, filed Oct. 11, 2005.

TECHNICAL FIELD

The present invention relates to a solid electrolytic capacitor with conductive polymer as solid electrolyte used in various electronic devices, a manufacturing method of the capacitor, and a digital signal processing circuit board including the capacitor.

BACKGROUND ART

Electronic devices are moving to higher frequencies. In line with this, capacitors, which are often used in power supply circuits and digital signal processing circuits as an electronic component, have been required to have excellent impedance characteristics at higher frequencies than before. In order to meet this demand, various solid electrolytic capacitors with solid electrolyte made of highly electric conductive polymer have been suggested.

FIG. 9 is a sectional view of a conventional solid electrolytic capacitor. FIG. 10 is a perspective view of the capacitor, and FIG. 11 is a partially cutaway perspective view of a capacitor element used in the capacitor. Capacitor element 20 includes anode portion 23 and cathode portion 24 which are formed on anode body 21. Anode body 21 is made of aluminum foil, which is a valve metal. Anode body 21 is divided into anode portion 23 and cathode portion 24 by first forming a dielectric oxide film layer on its surface and then being provided with insulating resist portion 22. Cathode portion 24 is provided on its surface with solid electrolyte layer 25 and cathode layer 26 laminated in this order. Cathode layer 26 is made of carbon and silver paste.

Anode portion 23 is mounted on the connecting face of anode terminal 27 and cathode portion 24 is mounted on the connecting face of cathode terminal 28, respectively. The connecting face of cathode terminal 28 is partly bent up to form guide portions 28A. A node portion 23 is resistance-welded to connecting portion 27A, which is formed by bending the connecting face of anode terminal 27. Cathode portion 24 is connected to the connecting face of cathode terminal 28 with unillustrated conductive silver paste.

Insulating coating resin 29 covers capacitor element 20 so as to expose part of anode terminal 27 and part of cathode terminal 28 which are connected to capacitor element 20 in this manner. Anode terminal 27 and cathode terminal 28 exposed from coating resin 29 are extended along the side surfaces and bent to the bottom surface of coating resin 29 so as to form external terminals. In this manner, a surface-mount-type solid electrolytic capacitor is structured. One such solid electrolytic capacitor is disclosed in Japanese Patent Unexamined Publication No. 2000-340463.

In the aforementioned conventional solid electrolytic capacitor, however, anode terminal 27 and cathode terminal 28 are so complicated in shape that it increases the cost of the capacitor. In addition, anode terminal 27 and cathode terminal 28 have a long distance between their connecting faces to which capacitor element 20 is connected and their mounting sides so as to increase ESL (equivalent series inductance) of the solid electrolytic capacitor.

In recent years, there is a high demand for reduction in size and increase in capacity of electrolytic capacitors used around the CPU in personal computers or in driving power supply circuits, switching power supply circuits, and the like. Furthermore, as the electrolytic capacitors are moving to higher frequencies, lower ESL is demanded to achieve excellent noise reduction and transient response as well as lower ESR (equivalent series resistance). The aforementioned conventional solid electrolytic capacitor, however, does not satisfy these requirements.

In order to satisfy the requirements, there have been suggested a solid electrolytic capacitor that has a shorter distance from the capacitor element to the mounting side. An example of such a solid electrolytic capacitor is shown in FIG. 12A as a cross section.

In capacitor element 41, anode lead 42 is connected to anode lead frame 43 and the cathode side thereof is connected to cathode lead frame 44. These connected areas and the whole of capacitor element 41 are coated with resin 45. The solid electrolytic capacitor is surf ace-mounted on circuit board 46. Anode lead frame 43 and cathode lead frame 44 that also function as external terminals are designed to have distance 47 of not more than 3 mm. Setting distance 47 between both electrodes to not more than 3 mm can reduce ESR and ESL of the solid electrolytic capacitor.

This solid electrolytic capacitor, however, has air tightness level not satisfying commercial requirements.

DISCLOSURE OF THE INVENTION

The solid electrolytic capacitor of the present invention includes a planar solid electrolytic capacitor element, an anode terminal, a cathode terminal, and electrically insulating coating resin. The solid electrolytic capacitor element has an anode portion and a cathode portion. The anode terminal is electrically connected at a first surface thereof to the anode portion. The cathode terminal is electrically connected at a third surface thereof to the cathode portion. The third surface is on the same side as the first surface of the anode portion. The coating resin integrally coats the solid electrolytic capacitor element in such a manner that a second surface opposite to the first surface and a fourth surface opposite to the third surface are exposed. The anode terminal and the cathode terminal are disposed as close to each other as not more than 3 mm. The anode terminal has stair steps at both ends thereof in the direction crossing the direction from the anode terminal to the cathode terminal. The stair steps are toward the anode portion. In this manner, the anode terminal is connected to the anode portion at the flat anode joint faces formed on the first surface side. On the other hand, the cathode terminal has stair steps at both ends thereof in the direction from the cathode terminal to the anode terminal. The stair steps are toward the cathode portion. In this manner, the cathode terminal is connected to the cathode portion at the flat cathode joint faces formed on the third surface side. The anode joint faces and the cathode joint faces are coated with the coating resin. The solid electrolytic capacitor can be provided with the anode joint faces and/or the cathode joint faces. In the aforementioned structure, the exposed distance from the capacitor element to the anode and cathode terminals is made as short as possible, and the anode and cathode terminals are disposed as close to each other as possible. This structure allows the solid electrolytic capacitor to have excellent ESR and ESL characteristics. Furthermore, the anode and cathode terminals are each provided with steps in the area to be connected to the capacitor element. This can greatly reduce the probability of water to reach the capacitor element through the coating resin. As a result of the reduction in the adverse effect of the water, the solid electrolytic capacitor can have improved reliability. Such a capacitor is suitable for a circuit in which a relatively large current flows on the primary and secondary sides of the power supply, thereby achieving an increase in capacity and a reduction in both ESR and ESL.

BRIEF DESCRIPTION OF THE DRAWINGS

FIG. 5A is a plan view of an anode terminal and a cathode terminal used in another solid electrolytic capacitor according to the embodiment of the present invention.

FIG. 5B is a sectional view taken along line 5B-5B of FIG. 5A.

FIG. 5C is a sectional view taken along line 5C-5C of FIG. 5A.

FIG. 5D is a sectional view taken along line 5D-5D of FIG. 5A.

FIG. 5E is a sectional view taken along line 5E-5E of FIG. 5A.

FIG. 8 is a frequency characteristic chart showing digital noise characteristics of a conventional digital signal processing circuit board.

FIG. 9 is a sectional view of the conventional solid electrolytic capacitor.

FIG. 10 is a perspective view of the solid electrolytic capacitor shown in FIG. 9.

FIG. 11 is a partially cutaway perspective view of a capacitor element used in the solid electrolytic capacitor shown in FIG. 9.

FIG. 12 is a sectional view showing a structure of another conventional solid electrolytic capacitor.

DESCRIPTION OF PREFERRED EMBODIMENT

Figure 1A:
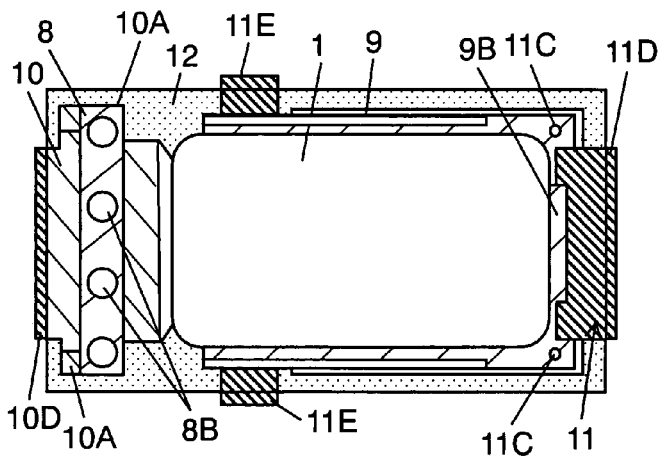
FIG. 1A is a top sectional view of a solid electrolytic capacitor according to an embodiment of the present invention.
Figure 2:
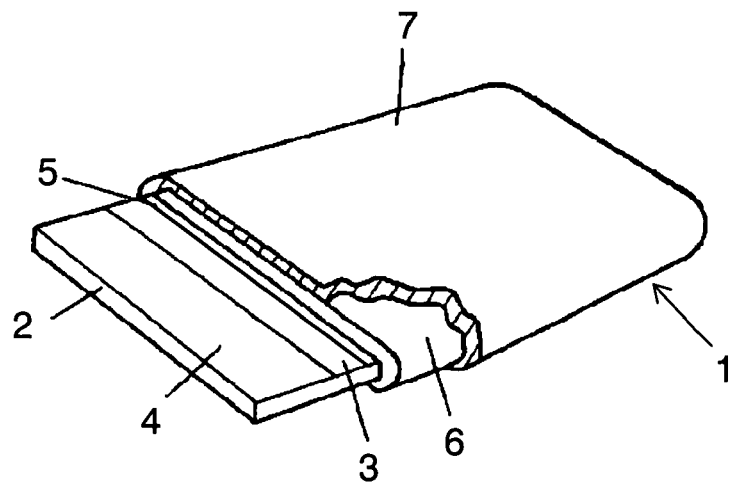
FIG. 2 is a partially cutaway perspective view of a capacitor element used in the solid electrolytic capacitor shown in FIG. 1A.
Figure 3:
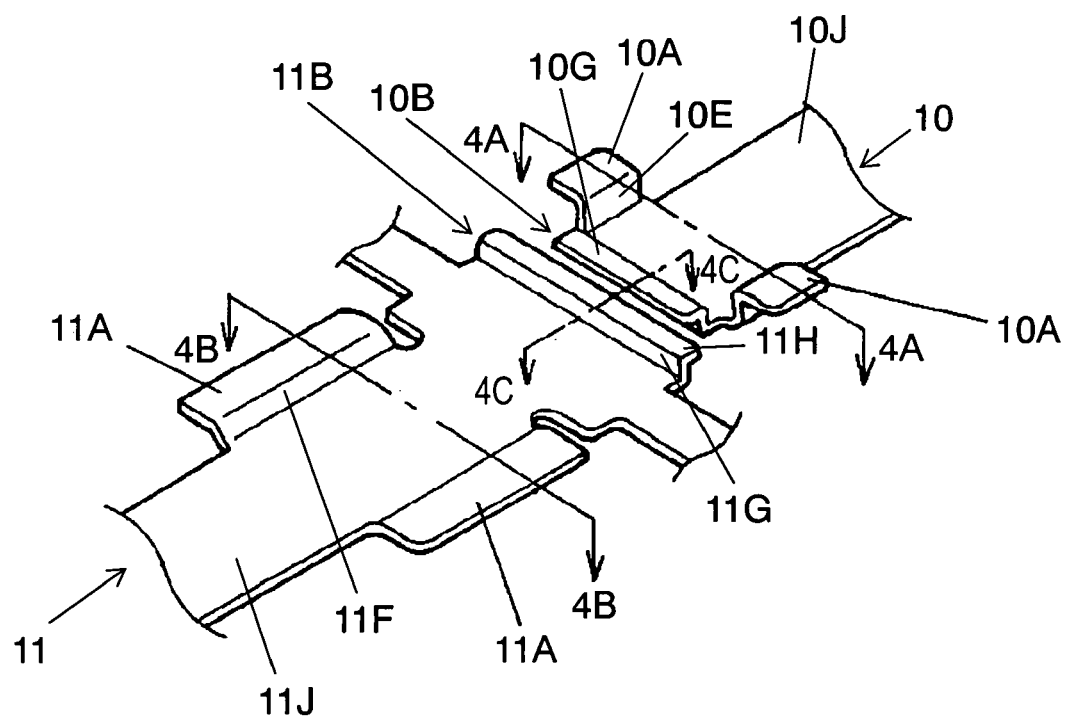
FIG. 3 is a perspective view of an essential part showing the construction of an anode terminal and a cathode terminal used in the solid electrolytic capacitor shown in FIG. 1A.
Figure 4A:
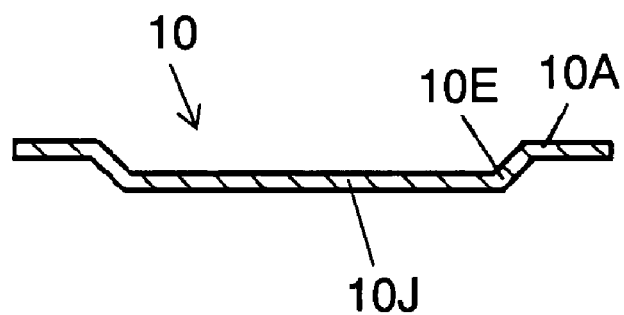
FIG. 4A is a sectional view taken along line 4A-4A of FIG. 3.
Figure 4B:
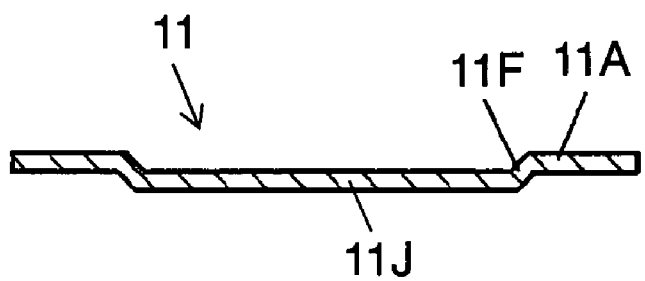
FIG. 4B is a sectional view taken along line 4B-4B of FIG. 3.
Figure 4C:
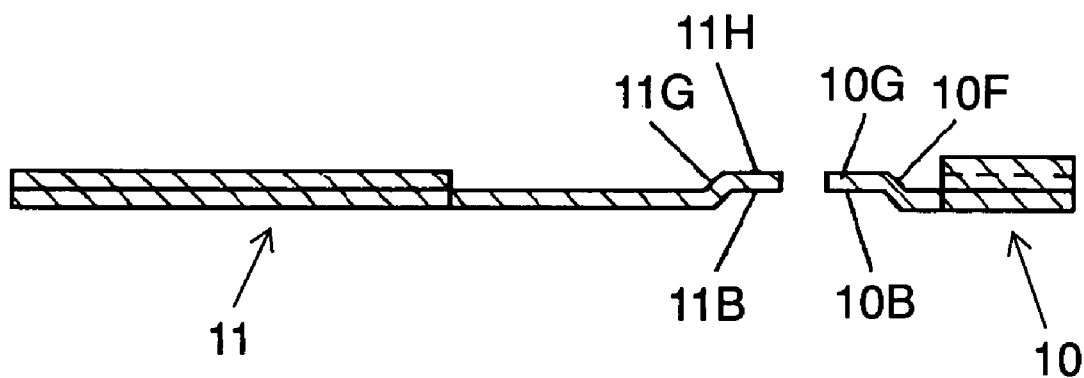
FIG. 4C is a sectional view taken along line 4C-4C of FIG. 3.

FIGS. 1A to 1D show top, front, bottom, and side sectional views, respectively, of a solid electrolytic capacitor according to an embodiment of the present invention. FIG. 2 is a partially cutaway perspective view of a capacitor element used in the solid electrolytic capacitor. FIG. 3 is a perspective view of an essential part showing the construction of an anode terminal and a cathode terminal used in the solid electrolytic capacitor. FIGS. 4A to 4C are sectional views of FIG. 3 taken along lines 4A-4A, 4B-4B, and 4C-4C, respectively.

Planar shaped solid electrolytic capacitor element (hereinafter, capacitor element) 1 includes anode portion 4 and cathode portion 5 formed on anode body 2. Anode body 2 is made of aluminum foil, which is a valve metal. Anode body 2 is divided into anode portion 4 and cathode portion 5 by first forming a dielectric oxide film layer (unillustrated) on its surface and then being provided with electrically-insulating resist portion 3. Cathode portion 5 is provided on its surface with solid electrolyte layer 6 and cathode layer 7 laminated in this order. Cathode layer 7 is made of carbon and silver paste.

Capacitor element 1 is mounted on anode lead frame 8. As an example, five laminated capacitor elements 1 are mounted in FIG. 1B. Anode portion 4 is mounted on anode lead frame 8 in this condition and guide portions 8A surrounds anode portion 4. Guide portions 8A are formed by bending the ends of anode lead frame 8. Then, joint portions 8B are laser-welded to anode portion 4 so that anode portion 4 is integrally connected with anode lead frame 8.

On the other hand, capacitor elements 1 are also mounted on cathode lead frame 9. Cathode portion 5 is mounted on cathode lead frame 9 with an unillustrated conductive adhesive. Cathode portion 5 is integrally connected to cathode lead frame 9 by being positioned and fixed by guide portions 9A on both sides and guide portion 9B at the end of cathode lead frame 9. Capacitor elements 1 which are laminated to each other and integrated by anode lead frame 8 and cathode lead frame 9 are hereinafter referred to as a capacitor element unit.

As shown in FIGS. 3 and 4A, anode terminal 10 includes step portions 10E on both sides of one end thereof adjacent to cathode terminal 11. Step portions 10E extend upward from bottom surface portion 10J whose bottom surface is a mounting face. The bottom surface of bottom surface portion 10J is a second surface of anode terminal 10. Anode terminal 10 further includes flat anode joint faces (hereinafter, joint faces) 10A connected to anode lead frame 8 via step portions 10E. Each of joint faces 10A and the corresponding one of step portions 10E are in the form of a stair step. In other words, anode terminal 10 is provided on the top surface thereof with flat joint faces 10A by forming stair steps toward anode portion 4. The stair steps are formed at both ends of anode terminal 10 in the direction crossing the direction from anode terminal 19 to cathode terminal 11. Joint faces 10A are electrically connected to anode portion 4. The top surfaces having joint faces 10A thereon is a first surface opposite to the second surface of anode terminal 10.

As shown in FIGS. 3 and 4C, anode terminal 10 further includes shield portion 10B shaped like a stair step. Shield portion 10B includes step portion 10F and flat portion 10G. Step portion 10F extends upward and toward cathode terminal 10J from bottom surface portion 10J. Flat portion 10G is formed adjacent to step portion 10F. In other words, step portions 10E and 10F extend from the bottom surface (the second surface) of bottom surface portion 10J of anode terminal 10 toward the top surface thereof (the first surface). These portions are formed integrally from a single base material by punching out and bending the material.

Figure 1B:
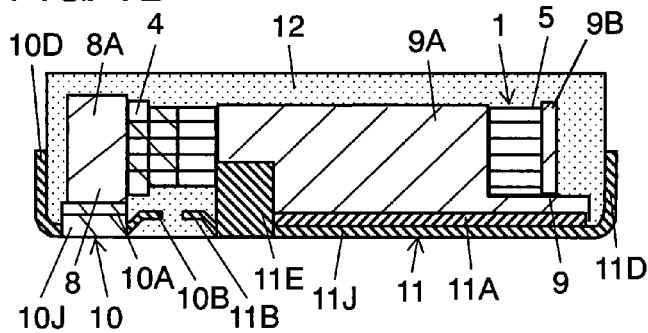
FIG. 1B is a front sectional view of the solid electrolytic capacitor shown in FIG. 1A.
Figure 1D:
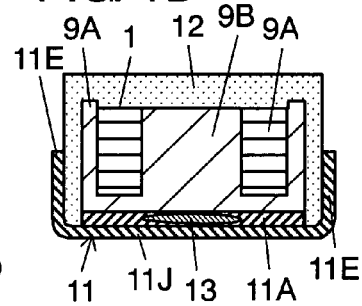
FIG. 1D is a side sectional view of the solid electrolytic capacitor shown in FIG. 1A.
Figure 1C:
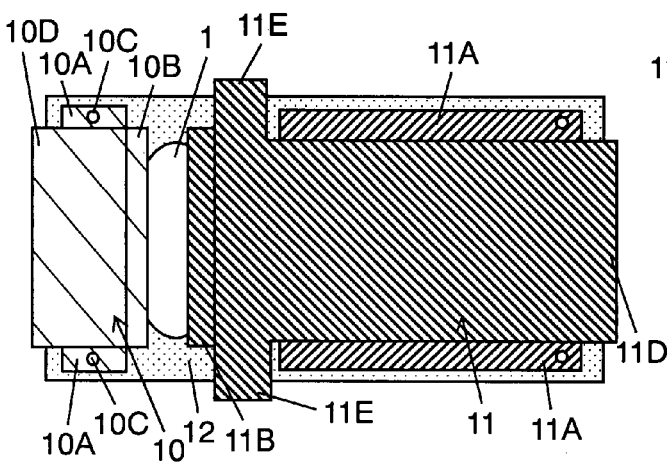
FIG. 1C is a bottom sectional view of the solid electrolytic capacitor shown in FIG. 1A.

As shown in FIGS. 1B and 1C, anode lead frame 8 is mounted on joint faces 10A and laser-welded to joint faces 10A at joint portions 10C of the top surface (the first surface) of anode terminal 10. In this manner, anode portion 4 and anode terminal 10 are electrically connected to each other on the top surface of anode terminal 10. Anode terminal 10 further includes first protrusion (hereinafter, protrusion) 10D formed by extending an end of bottom surface portion 10J in the direction from cathode terminal 11 to anode terminal 10 so as to protrude from coating resin 12. Protrusion 10D is then bent upward along a side surface of coating resin 12. In other words, protrusion 10D is bent toward capacitor element 1 from anode terminal 10.

Cathode terminal 11 includes bottom surface portion 11J whose bottom surface is to be a mounting face. In other words, bottom surface portion 11J is formed between joint faces 11A. The bottom surface of bottom surface portion 11J is a fourth surface of cathode terminal 11. This allows cathode terminal 11 to be as close to anode terminal 10 as possible. As shown in FIGS. 3 and 4B, cathode terminal 11 includes step portions 11F extending upward from bottom surface portion 11J. Step portions 11F are at both ends of cathode terminal 11 in the direction crossing the direction between anode terminal 10 and cathode terminal 11. Cathode terminal 11 further includes flat cathode joint faces (hereinafter, joint faces) 11A connected to cathode lead frame 9 via step portions 11F. Each of joint faces 11A and the corresponding one of step portions 11F are in the form of a stair step. In other words, cathode terminal 11 is provided on the top surface thereof with joint faces 11A by forming stair steps toward cathode portion 5. The stair steps are formed at both ends of cathode terminal 11 in the direction crossing the direction from cathode terminal 11 to anode terminal 10. The top surface having joint faces 11A thereon is a third surface opposite to the fourth surface of cathode terminal 11. The first surface of anode terminal 10 and the third surface of cathode terminal 11 are on the same side. Joint faces 11A are electrically connected to cathode portion 5.

As shown in FIGS. 3 and 4C, cathode terminal 11 further includes shield portion 11B shaped like a stair step. Shield portion 11B includes step portion 11G and flat portion 11H. Step portion 11G extends diagonally upward toward anode terminal 10 from bottom surface portion 11J. Flat portion 11H is formed adjacent to step portion 11G. In other words, step portions 11F and 11G extend from the bottom surface of bottom surface portion 11J of cathode terminal 11 toward the top surface thereof. These portions are formed integrally from a single base material by punching out and bending the material. As shown in FIGS. 1A, 1B, and 1D, cathode lead frame 9 is mounted on joint faces 11A and laser-welded to cathode terminal 11 at joint portions 11C. In this manner, cathode portion 5 and cathode terminal 11 are electrically connected to each other on the top surface of cathode terminal 11. Cathode terminal 11 further includes second protrusion (hereinafter, protrusion) 11D and third protrusions (hereinafter, protrusions) 11E formed by extending each end of bottom surface portion 11J of cathode terminal 11 so as to protrude from coating resin 12. Protrusions 11D and 11E are then bent upward along side surfaces of coating resin 12. More specifically, protrusion 11D is extended in the direction from anode terminal 10 to cathode terminal 11 so as to protrude from coating resin 12. Protrusion 11D is then bent in the direction from cathode terminal 11 to capacitor elements 1 along a side surface of coating resin 12. Protrusions 11E are extended in the direction crossing the direction from cathode terminal 11 to anode terminal 10 so as to protrude from coating resin 12 and are then bent in the direction from cathode terminal 11 to capacitor elements 1 along side surfaces of coating resin 12.

As described above, protrusions 10D, 11D, and 11E are preferably bent upward along coating resin 12. This structure ensures the mounting of the solid electrolytic capacitor on a printed-circuit board because the capacitor is soldered to the printed-circuit board with solder fillets.

Figure 1E:
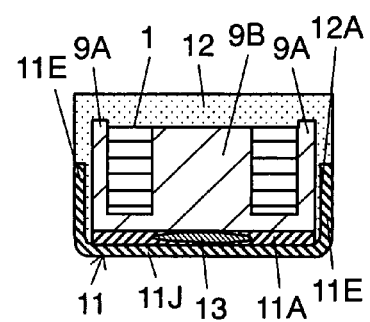
FIG. 1E is a side sectional view of another solid electrolytic capacitor according to the embodiment of the present invention.

Insulating coating resin 12 coats the capacitor element unit so as to expose the bottom surface of bottom surface portion 10J and the bottom surface of bottom surface portion 11J. The bottom surface (the third surface) of bottom surface portion 10J is to be the mounting face of anode terminal 10, and the bottom surface (the fourth surface) of bottom surface portion 11J is to be the mounting face of cathode terminal 11. Coating resin 12 is made of epoxy resin or the like. As shown in the sectional view of FIG. 1E, coating resin 12 may be provided on its side surfaces with recessed portions 12A to accommodate protrusions 11E. This structure can reduce the dimension in the width direction of the solid electrolytic capacitor, making it easier to have a product size within a tolerance range. Although not illustrated, recessed portions 12A may be provided in the positions corresponding to protrusions 10D and 11D. This structure can reduce the dimension in the longitudinal direction of the solid electrolytic capacitor, also making it easier to have a product size within a tolerance range.

Conductive paste 13 is filled in a void area between cathode terminal 11 and cathode lead frame 9 which is connected to joint faces 11A of cathode terminal 11. Conductive paste 13 improves the reliability of the connection between cathode terminal 11 and cathode lead frame 9 and decreases connection resistance. Conductive paste 13 contains metal powder such as silver and copper. Note that conductive paste 13 can be replaced by conductive adhesive.

A plurality of anode terminals 10 and a plurality of cathode terminals 11 are structured in this manner and arranged at predetermined intervals on a hoop base material made of a copper alloy. Then, a capacitor element unit is mounted and connected to each pair of anode terminal 10 and cathode terminal 11, integrally coated with coating resin 12, and separated from the base material to be individual components.

Coating resin 12 coats step portions 10E, joint faces 10A, and shield portion 10B which are formed on anode terminal 10, and step portions 11F, joint faces 11A, and shield portion 11B which are formed on cathode terminal 11 so as not to expose them outside. Shaping each flat portion and the corresponding step portion like a stair step in this manner can clarify the boundaries between coating resin 12 and the bottom surface portion, which is to be the mounting face of each terminal. This structure can prevent coating resin 12 from reaching the bottom surface portion, which is to be the mounting face of each terminal.

In the solid electrolytic capacitor of the present embodiment structured in this manner, anode and cathode terminals 10 and 11, which are substantially planar shaped, allow anode portion 4 and cathode portion 5 of each capacitor element 1 to be electrically connected to the outside of the capacitor. This structure can reduce the exposed distance from capacitor element 1 to each terminal. Furthermore, bottom surface portion 11J of cathode terminal 11 and bottom surface portion 10J of anode terminal 10 are disposed close to each other so that the path between anode terminal 10 and cathode terminal 11 can have the smallest possible length. As a result, the solid electrolytic capacitor can have excellent ESR characteristics and reduced ESL. In particular, the ESL characteristics of the solid electrolytic capacitor of the present embodiment are as low as 600 pH, which is about ⅓ of the conventional level of 1500 pH.

The capacitor element unit including capacitor elements 1 is connected to anode terminal 10 and cathode terminal 11 which have mounting faces. Anode terminal 10 includes step portions 10E extending upward from bottom surface portion 10J. Anode terminal 10 further includes flat joint faces 10A connected to anode lead frame 8 via step portions 10E. Each of joint faces 10A and the corresponding one of step portions 10E are in the form of a stair step. On the other hand, cathode terminal 11 includes step portions 11F extending upward from bottom surface portion 11J. Cathode terminal 11 further includes flat joint faces 11A connected to cathode lead frame 9 via step portions 11F. Each of joint faces 11A and the corresponding one of step portions 11F are in the form of a stair step. The provision of these steps at the joint portions between the capacitor element unit and terminals 10 and 11 can increase the contact area between coating resin 12 and terminals 10 and 11. This structure improves adhesion between coating resin 12 and terminals 10 and 11, thereby increasing the air tightness level. The structure also increases the distance from the outside to the capacitor element unit, thereby lengthening the route of entry of water or the like from outside. This can greatly reduce the probability of water to reach and damage capacitor elements 1 through coating resin 12. As a result, the reliability of the solid electrolytic capacitor can be improved. In the aforementioned description, the step structure is provided to both of anode terminal 10 and cathode terminal 11, but may be provided to only one of them.

Anode terminal 10 further includes shield portion 10B, which extends upward and toward cathode terminal 11 from an end of bottom surface portion 10J and is coated with coating resin 12. On the other hand, cathode terminal 11 further includes shield portion 11B, which extends upward and toward anode terminal 10 from an end of bottom surface portion 11J and is coated with coating resin 12. The provision of these shield portions can further increase the contact area between coating resin 12 and terminals 10 and 11. As a result, the adverse effect of the water entering through coating resin 12 can be further reduced, thereby improving the reliability of the solid electrolytic capacitor. In the aforementioned description, each of anode terminal 10 and cathode terminal 11 is provided with a shield portion, but alternatively only one of the terminals may be provided.

Anode terminal 10 includes joint faces 10A to which anode lead frame 8 is laser-welded. On the other hand, cathode terminal 11 includes joint faces 11A to which cathode lead frame 9 is laser-welded. Then, joint faces 10A and 11A are coated with coating resin 12. This structure allows coating resin 12 to coat welding marks, thereby improving the appearance. The structure also eliminates the potential of the welding marks to cause floats during mounting so as to result in mounting failure. As a result, mounting reliability can be greatly improved.

The following is a specific description of changes in ESL values when the distance between shield portions 10B and 11B (the distance between terminals 10 and 11) is changed. In samples 1, 2, and 3, the distance between shield portions 10B and 11B is set to 3 mm, 2 mm, and 1 mm, respectively, to form solid electrolytic capacitors with a rating of 6.3V, 47 μF. As a comparative sample, the conventional solid electrolytic capacitor shown in FIG. 9 is formed without anode and cathode terminals 10 and 11. Solid electrolytic capacitors of samples 1 to 3 and the conventional solid electrolytic capacitor as the comparative sample are thus prepared. Then, they are evaluated for the following characteristics: electrostatic capacitance, tangent of loss angle, ESR value, ESL value, and leakage current after two minutes from applying 10V. The measurement results are shown in Table 1. Each sample includes ten capacitors and the table shows the average values.

TABLE 1

| | Electrostatic capacitance (μF) | Tangent of loss angle (%) | Leakage current (μA) | ESR (mO) | ESL (pH) |
|---|---|---|---|---|---|
| Sample 1 | 47.0 | 0.06 | 0.1 | 18.0 | 1000 |
| Sample 2 | 47.0 | 0.07 | 0.2 | 18.0 | 800 |
| Sample 3 | 47.0 | 0.08 | 0.3 | 18.0 | 500 |
| Comparative Sample | 47.0 | 0.09 | 0.4 | 18.0 | 1500 |

As apparent from Table 1, setting the distance between shield portions 10B and 11B to not more than 3 mm can achieve lower ESL. Anode terminal 10 and negative terminal 11 are electrically-isolated and disposed at a distance of not more than 3 mm therebetween. Shorter the distance becomes, smaller the ESL can be. More specifically, the distance between shield portions 10B and 11B is preferably not more than 2 mm, and more preferably not more than 1 mm. However, when the distance is less than 0.1 mm, shield portions 10B and 11B should be carefully disposed not to cause a short circuit.

Anode body 2 composing capacitor element 1 is made of aluminum foil in the present embodiment; however, aluminum foil is not the only material that can be used for anode body 2 in the present invention. Alternatively, it is possible to use foil or a sintered body of tantalum or niobium, or a combination of these.

In the present embodiment, capacitor elements 1 are once connected to lead frames 8 and 9 and then connected to terminals 10 and 11 via lead frames 8 and 9. Alternatively, capacitor elements 1 may be connected directly to joint faces 10A of anode terminal 10 and joint faces 11A of cathode terminal 11. This structure eliminates the need for lead frames 8 and 9, thereby reducing the number of parts. However, this structure may degrade part accuracy, so that it is preferable from a manufacturing point of view to connect capacitor elements 1 first to lead frames 8 and 9.

The following is a description of a solid electrolytic capacitor having another structure of the present embodiment with reference to FIGS. 5A to 5E. This solid electrolytic capacitor differs from the solid electrolytic capacitor shown in FIGS. 1A to 1D in the shape of the anode and cathode terminals. These capacitors are identical to each other in other aspects, so that the following description will focus on their differences.

FIGS. 5A to 5E show the structure of another anode terminal and another cathode terminal used in the solid electrolytic capacitor according to the embodiment of the present invention as a plan view and sectional views taken along lines 5B-5B, 5C-5C, 5D-5D, and 5E-5E, respectively. FIG. 5A shows a hoop material punched so that a pair of anode terminal 14 and cathode terminal 15 is formed to face each other.

In FIGS. 5A and 5C, anode terminal 14 includes flat anode joint faces (hereinafter, joint faces) 14A connected to anode lead frame 8 at both ends of anode terminal 14 in the direction crossing the direction from anode terminal 14 to cathode terminal 15. Joint faces 14A are formed by forming upward stair steps. In other words, joint faces 14A are formed on the top surface (the first surface) of anode terminal 14 so as to be connected to anode portion 4, and the stair steps upward and toward anode portion 4 are formed at both ends of anode terminal 14 in the direction crossing the direction from anode terminal 14 to cathode terminal 15.

Joint faces 14A includes joint portions 14B of the same size as joint portions 10C shown in FIG. 1C. Joint portions 14B are to be weld-connected to anode lead frame 8. Anode terminal 14 further includes shield portion 14C extending upward and toward cathode terminal 15. These portions are formed integrally from a single base material mainly by punching out and bending the material. Joint portions 14B are formed by pressing. Anode lead frame 8 is mounted on joint faces 14A and laser-welded to anode terminal 14 at joint portions 14B. Anode terminal 14 further includes first protrusion (hereinafter, protrusion) 14D by extending an end of bottom surface portion 14J so as to protrude from coating resin 12. Protrusion 14D is then bent upward along a side surface of coating resin 12.

Cathode terminal 15 includes shield portion 15B and flat joint face 15A which is connected to cathode lead frame 9. Cathode terminal 15 further includes thin wall portions 15K at both ends thereof in the direction crossing the direction toward anode terminal 14. Each of thin wall portions 15K forms a step between bottom surface portion 15J which is to be the mounting face, and itself. Shield portion 15B extends upward and toward anode terminal 14. These portions are formed integrally from a single base material by punching out and bending the material. Cathode lead frame 9 is mounted on joint face 15A and laser-welded to cathode terminal 15 at thin wall portions 15K. In other words, the parts of joint face 15A that are provided with thin wall portions 15K are flat cathode joint faces to be connected to cathode portion 5. The aforementioned parts are formed on the bottom surface (fourth surface) of cathode terminal 15 by forming a stair step toward cathode portion 5 at both ends of cathode terminal 15 in the direction crossing the direction from cathode terminal 15 to anode terminal 14.

Second protrusion (hereinafter, protrusion) 15D and third protrusions (hereinafter, protrusions) 15E are formed by extending ends of bottom surface portion 15J of cathode terminal 15 so as to protrude from coating resin 12 and bent upward along side surfaces of coating resin 12.

The solid electrolytic capacitor prepared using anode terminal 14 and cathode terminal 15 has the same effects as the solid electrolytic capacitor shown in FIG. 1A. In the case of this solid electrolytic capacitor, joint portions 14B formed on joint faces 14A of anode terminal 14 allow the welding between anode terminal 14 and anode lead frame 8 reliable. As a result, the welding strength can be stable between anode terminal 14 and anode lead frame 8; thereby the welding reliability is improved.

Figure 6:
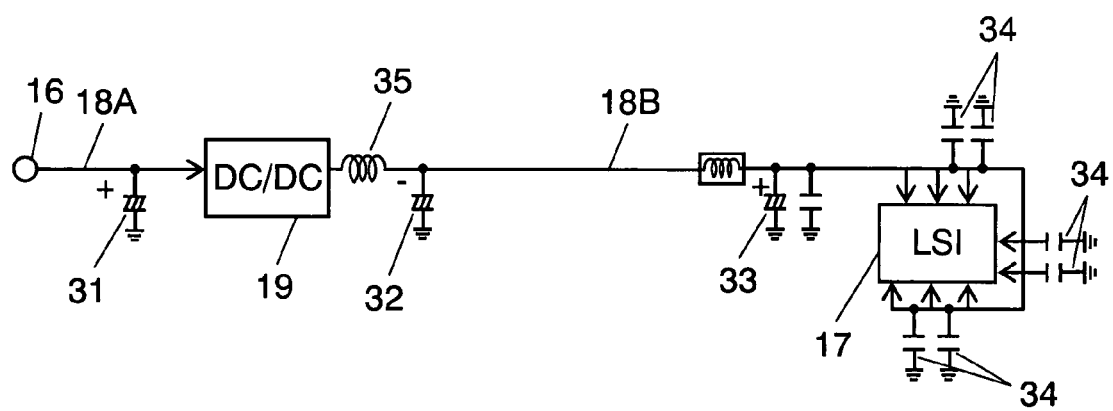
FIG. 6 is a circuit diagram of a digital signal processing circuit board according to the embodiment of the present invention.

The following is a description of a digital signal processing circuit board using either one of the solid electrolytic capacitors of the present embodiment. FIG. 6 is a circuit diagram in which the solid electrolytic capacitor according to the present invention is used as a smoothing capacitor and a decoupling capacitor.

Power supply lines (hereinafter, lines) 18A and 18B connect power supply 16 and LSI 17, which is connected to a clock driving element. In other words, lines 18A and 18B provide LSI 17 with electric power. Line 18A is an input-side power supply line of DC/DC converter 19 and line 18B is an output-side power supply line thereof. Decoupling capacitor (hereinafter, capacitor) 33 formed of a solid electrolytic capacitor is connected between line 18B and the ground. DC/DC converter 19 to which the clock driving element is connected is disposed between lines 18A and 18B. Smoothing capacitors (hereinafter, capacitors) 31 and 32 are connected between the ground and line 18A on the input side of DC/DC converter 19 and between the ground and line 18B on the output side of DC/DC converter 19, respectively. Noise-removing capacitors 34 formed of ceramic capacitors are connected between the ground and LSI 17, respectively. Choke coil 35 is connected to DC/DC converter 19 in series.

The aforementioned surface-mount-type solid electrolytic capacitors are used as capacitors 31, 32, and 33. These capacitors have ESR of 18 mO at 100 kHz, and ESL of 500 pH at 500 MHz. Using the low-ESR and low-ESL solid electrolytic capacitors as capacitors 31, 32, and 33 can ensure the supply voltage necessary for driving LSI 17.

In this circuit structure, the clock required for synchronizing LSI 17 causes high-frequency radiation noise. In addition, a switching element included in DC/DC converter 19 causes switching noise. These noises are transmitted through lines 18, but greatly reduced because of being drawn into the ground via capacitors 31, 32, and 33.

Figure 7:
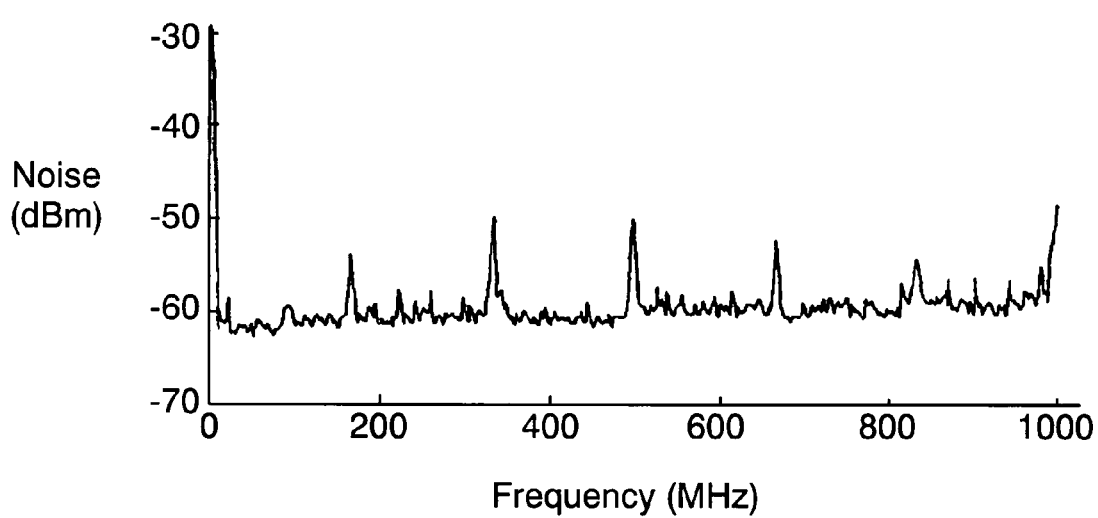
FIG. 7 is a frequency characteristic chart showing digital noise characteristics of the digital signal processing circuit board shown in FIG. 6.

FIG. 7 is a frequency characteristic chart showing digital noise characteristics of the digital signal processing circuit board of the present embodiment. FIG. 8 is a frequency characteristic chart showing digital noise characteristics of a conventional digital signal processing circuit board. As apparently by comparing FIGS. 7 and 8, the digital noise is greatly reduced when using the digital signal processing circuit board of the present embodiment. Or, the number of noise-removing capacitors 34 to be connected between LSI 17 and the ground can be reduced to about ½ to ⅓.

As described hereinbefore, in the digital signal processing circuit board of the present embodiment, the low-ESR and low-ESL solid electrolytic capacitors are used as the decoupling capacitor and the smoothing capacitor. As a result, the digital noise can be greatly reduced, or the number of the noise-removing capacitors can be greatly reduced while maintaining the necessary characteristics. This contributes to a reduction in size and cost of the digital signal processing circuit board.

In the aforementioned description, the solid electrolytic capacitors of the present embodiment are used for all of capacitors 31, 32, and 33 shown in FIG. 6; however, the solid electrolytic capacitor of the present embodiment may be used only one of these capacitors.

INDUSTRIAL APPLICABILITY

In the solid electrolytic capacitor according to the present invention, the drawing distance between the capacitor element and the terminals is made as short as possible, and the bottom surface of the cathode terminal is disposed as close to the bottom surface of the anode terminal as possible. This structure can provide excellent ESR and ESL characteristics. Furthermore, the provision of the steps in the area where the capacitor element unit is to be connected to each of the anode and cathode terminals can greatly reduce the probability of water to reach the capacitor element through the coating resin. As a result of the reduction in the adverse effect of the water, the solid electrolytic capacitor can have improved reliability. This solid electrolytic capacitor is suitable to a decoupling capacitor or a smoothing capacitor used in a digital signal processing circuit board. The digital signal processing circuit board with such a structure has a greatly reduced level of digital noise, leading to a drastic reduction in the number of the noise-removing capacitors. As a result, the whole circuit board can be reduced in size and in cost. Such a capacitor and a circuit board can be usefully used around the CPU in personal computers or in driving power supply circuits, switching power supply circuits, and the like.

The invention claimed is:

1. A solid electrolytic capacitor comprising:
    a planar solid electrolytic capacitor element having an anode portion and a cathode portion;
    an anode terminal having a first surface and a second surface opposite to the first surface, the anode terminal being electrically connected to the anode portion on a side of the first surface;
    a cathode terminal having a third surface on a same side as the first surface of the anode portion and a fourth surface opposite to the third surface, the cathode terminal being electrically connected to the cathode portion on a side of the third surface and electrically isolated from the anode terminal; and
    electrically insulating coating resin integrally coating the solid electrolytic capacitor element in such a manner that the second surface and the fourth surface are exposed,
    wherein at least one of following conditions is satisfied:
    the anode terminal includes flat anode joint faces to be connected to the anode portion, the anode joint faces being disposed on the side of the first surface, formed by providing a stair step toward the anode portion at both ends of the anode terminal in a direction crossing a direction from the anode terminal to the cathode terminal, and coated with the coating resin; and
    the cathode terminal includes flat cathode joint faces to be connected to the cathode portion, the cathode joint faces being disposed on the side of the third surface, formed by providing a stair step toward the cathode portion at both ends of the cathode terminal in a direction crossing a direction from the cathode terminal to the anode terminal, and coated with the coating resin, and
    the anode terminal and the cathode terminal are disposed as close to each other as not more than 3 mm.

2. The solid electrolytic capacitor according to claim 1, wherein at least one of following conditions is satisfied:
    the anode terminal further includes an anode shield portion extending from the second surface to the first surface and toward the cathode terminal from an end of the second surface, the end of the second surface being adjacent to the cathode terminal; and the anode shield portion being coated with the coating resin; and
    the cathode terminal further includes a cathode shield portion extending from the fourth surface to the third surface and toward the anode terminal from an end of the fourth surface, the end of the fourth surface being adjacent to the anode terminal; and the cathode shield portion being coated with the coating resin.

3. The solid electrolytic capacitor according to claim 2, wherein
    the anode shield portion includes a step portion and a flat portion, the step portion extending from the second surface to the first surface, and the flat portion forming a stair step together with the step portion, and
    the step portion and the flat portion are coated with the coating resin.

4. The solid electrolytic capacitor according to claim 2, wherein
    the cathode shield portion includes a step portion and a flat portion, the step portion extending from the fourth surface to the third surface, and the flat portion forming a stair step together with the step portion, and
    the step portion and the flat portion are coated with the coating resin.

5. The solid electrolytic capacitor according to claim 1, wherein
    the anode terminal further includes step portions extending from the second surface to the first surface, the anode joint faces form stair steps together with the step portions, and
    the step portions and the anode joint faces are coated with the coating resin.

6. The solid electrolytic capacitor according to claim 1, wherein
    the cathode terminal further includes step portions extending from the fourth surface to the third surface,
    the cathode joint faces form stair steps together with the step portions, and
    the step portions and the cathode joint faces are coated with the coating resin.

7. The solid electrolytic capacitor according to claim 1, further comprising:
    an anode lead frame connected between the anode portion and the anode terminal; and
    a cathode lead frame connected between the cathode portion and the cathode terminal.

8. The solid electrolytic capacitor according to claim 7, further comprising:
    one of conductive paste and conductive adhesive, the one being in a void area formed between the cathode terminal and the cathode lead frame connected to the cathode joint faces.

9. The solid electrolytic capacitor according to claim 7, wherein
    each of the anode joint faces includes a joint portion to be weld-connected to the anode lead frame.

10. The solid electrolytic capacitor according to claim 1, wherein
    the anode terminal includes a first protrusion extending so as to protrude from the coating resin in a direction from the cathode terminal to the anode terminal and being bent along a side surface of the coating resin in a direction from the anode terminal to the solid electrolytic capacitor element; and
    the cathode terminal includes a second protrusion extending so as to protrude from the coating resin in a direction from the anode terminal to the cathode terminal and being bent along a side surface of the coating resin in a direction from the cathode terminal to the solid electrolytic capacitor element.

11. The solid electrolytic capacitor according to claim 10, wherein
    the coating resin includes a recessed portion to accommodate one of the first protrusion and the second protrusion.

12. The solid electrolytic capacitor according to claim 1, further comprising:
    a third protrusion extending so as to protrude from the coating resin in a direction crossing a direction from the cathode terminal to the anode terminal and being bent along a side surface of the coating resin in a direction from the cathode terminal to the solid electrolytic capacitor element.

13. The solid electrolytic capacitor according to claim 12, wherein
the coating resin includes a recessed portion to accommodate the third protrusion.

14. A digital signal processing circuit board comprising:
an LSI;
a power supply line configured to supply the LSI with electric power; and
a decoupling capacitor being the solid electrolytic capacitor according to claim 1, and being connected between the power supply line and ground.

15. A digital signal processing circuit board comprising:
a DC/DC converter;
an input-side power supply line of the DC/DC converter;
an output-side power supply line of the DC/DC converter; and
at least one of an input-side smoothing capacitor connected between the input-side power supply line of the DC/DC converter and ground, and an output-side smoothing capacitor connected between the output-side power supply line of the DC/DC converter and ground, each of said input-side smoothing capacitor and said output-side smoothing capacitor being constituted by a solid electrolytic capacitor according to claim 1.

16. A method for manufacturing a solid electrolytic capacitor, the method comprising:
A) disposing an anode terminal and a cathode terminal so as to be electrically-isolated to each other at a distance of not more than 3 mm therebetween;
B) performing at least one of followings:
forming flat anode joint faces to be connected to an anode portion of the solid electrolytic capacitor element on a side of a first surface of the anode terminal by forming a stair step toward the anode portion at both ends of the anode terminal in a direction crossing a direction from the anode terminal to the cathode terminal; and
forming flat cathode joint faces to be connected to a cathode portion of the solid electrolytic capacitor element on a side of a third surface of the cathode terminal on a same side as the first surface of the anode terminal by forming a stair step toward the cathode portion at both ends of the cathode terminal in a direction crossing a direction from the cathode terminal to the anode terminal;
C) electrically connecting the anode portion to the first surface of the anode terminal;
D) electrically connecting the cathode portion to the third surface of the cathode terminal; and
E) integrally coating the solid electrolytic capacitor element with electrically insulating coating resin in such a manner that a second surface opposite to the first surface and a fourth surface opposite to the third surface are exposed, and also coating at least one of the anode joint face and the cathode joint face formed in the step B.

17. The method for manufacturing a solid electrolytic capacitor according to claim 16, further comprising
F) performing at least one of followings:
forming an anode shield portion extending from the second surface to the first surface and toward the cathode terminal from an end of the second surface, the end of the second surface being adjacent to the cathode terminal; and
forming a cathode shield portion extending from the fourth surface to the third surface and toward the anode terminal from an end of the fourth surface, the end of the fourth surface being adjacent to the anode terminal, wherein
at least one of the anode shield portion and the cathode shield portion formed in the step F is coated in the step E.

18. The method for manufacturing a solid electrolytic capacitor according to claim 16, wherein
in the step C, the anode portion is integrally connected to an anode lead frame, and the anode lead frame is connected to the anode terminal; and
in the step D, the cathode portion is integrally connected to a cathode lead frame, and the cathode lead frame is connected to the cathode terminal.

19. The method for manufacturing a solid electrolytic capacitor according to claim 16, further comprising:
G) forming a first protrusion by extending the anode terminal so as to protrude from the coating resin in a direction from the cathode terminal to the anode terminal, and forming a second protrusion by extending the cathode terminal so as to protrude from the coating resin in a direction from the anode terminal to the cathode terminal; and
H) bending the first protrusion along a side surface of the coating resin in a direction from the anode terminal to the solid electrolytic capacitor element; and bending the second protrusion along a side surface of the coating resin in a direction from the cathode terminal to the solid electrolytic capacitor element.

20. The method for manufacturing a solid electrolytic capacitor according to claim 19, further comprising:
J) forming a plurality of recessed portions on side surfaces of the coating resin, respectively, wherein
in the step H, the first protrusion and the second protrusion are bent to be accommodated in the plurality of recessed portions.

21. The method for manufacturing a solid electrolytic capacitor according to claim 16, wherein
each of the anode terminal and the cathode terminal is integrally formed by punching out and bending a single base material.

* * * * *